United States Patent
Tsujioka et al.

(10) Patent No.: US 8,138,258 B2
(45) Date of Patent: Mar. 20, 2012

(54) CLEAR COATING COMPOSITION FOR AN AUTOMOBILE AND METHOD OF FORMING A MULTI-LAYER COATING FILM USING THE SAME

(75) Inventors: Hideaki Tsujioka, Neyagawa (JP); Junji Shimada, Neyagawa (JP); Hisaki Tanabe, Neyagawa (JP); Mirei Kato, Toyota (JP); Yoshinori Narita, Toyota (JP)

(73) Assignees: Nippon Paint Co., Ltd., Osaka (JP); Toyota Jidosha Kabushiki Kaisha, Toyota-Shi, Aichi (JP)

( * ) Notice: Subject to any disclaimer, the term of this patent is extended or adjusted under 35 U.S.C. 154(b) by 1022 days.

(21) Appl. No.: 11/313,786

(22) Filed: Dec. 22, 2005

(65) Prior Publication Data
US 2006/0147639 A1  Jul. 6, 2006

(30) Foreign Application Priority Data
Dec. 22, 2004  (JP) .................. 2004-370987

(51) Int. Cl.
*C08L 75/00*  (2006.01)
(52) U.S. Cl. ............ 524/507; 427/372.2; 427/384; 427/385.5; 427/402; 427/407.1; 524/558; 524/589; 524/590
(58) Field of Classification Search .......... 524/507, 524/558, 589, 590; 427/372.2, 384, 385.5, 427/402, 407.1
See application file for complete search history.

(56) References Cited

U.S. PATENT DOCUMENTS

| 5,322,861 A | 6/1994 | Tsuge et al. |
| 5,514,755 A | 5/1996 | Fenn et al. |
| 5,521,272 A * | 5/1996 | O'Connor et al. ........... 528/45 |
| 5,849,835 A * | 12/1998 | Das et al. ................. 524/590 |
| 6,013,739 A | 1/2000 | Rink et al. |
| 2005/0159537 A1* | 7/2005 | Huynh-Ba et al. .......... 524/507 |

FOREIGN PATENT DOCUMENTS

| JP | 02-045577 A | 2/1990 |
| JP | 03-287650 A | 12/1991 |
| JP | 05-202335 A | 8/1993 |
| JP | 2007-196982 | 1/1995 |
| JP | HEI-07-196982 (A) | 1/1995 |
| JP | 09-132753 A | 5/1997 |
| JP | 2003-082031 A | 3/2003 |
| JP | 2003-082031 (A) | 3/2003 |
| JP | 2003-253191 A | 9/2003 |

OTHER PUBLICATIONS

Japanese Office Action Serial No. JP2004-370987 issued Oct. 21, 2010.

* cited by examiner

*Primary Examiner* — David W Wu
*Assistant Examiner* — Marie Reddick
(74) *Attorney, Agent, or Firm* — Fitch, Even, Tabin & Flannery

(57) ABSTRACT

An automotive clear coating composition includes a hydroxyl group-containing acrylic resin obtained using hydroxyalkyl (meth)acrylate having a hydroxyalkyl group having 4-9 carbon atoms as at least a part of its monomer; and a polyfunctional isocyanate compound in which at least a part thereof is an isocyanurate type isocyanate compound. The prepared composition has 25 to 50 mass % of a soft segment part with respect to a total solid content of such acrylic resin and the polyfunctional isocyanate compound, and a ratio of a soft segment part derived from a lactone-containing monomer with respect to the total solid content of such acrylic resin and the polyfunctional isocyanate compound of not more than 4.5 mass %. A cured coating film has a dynamic glass transition temperature within a range of 30 to 60° C. The soft segment part is represented by $-\mathrm{CH}_2)_n-$ wherein n represents an integer of 4 or more.

8 Claims, No Drawings

CLEAR COATING COMPOSITION FOR AN AUTOMOBILE AND METHOD OF FORMING A MULTI-LAYER COATING FILM USING THE SAME

This Application is an U.S. Nonprovisional Utility Patent Application that claims foreign priority, pursuant to 35 U.S.C. §119, from Japanese Patent Application No. 2004-370987 filed Dec. 22, 2004, the complete disclosure of which is incorporated herein by reference.

BACKGROUND OF THE INVENTION

1. Field of the Invention

The present invention relates to a clear coating composition for an automobile and to a method of forming a multi-layer coating film using the same.

2. Description of the Related Art

As a binder to be used for the top coat for an automobile, a hydroxyl group-containing polymer and a melamine polymer curing agent are commonly used in combination. For example, Japanese Patent Application Laid-Open Gazette No. Hei 5-202335 (JP 5-202335 A) describes a thermosetting coating composition containing hydroxyl group-containing acrylic resin, alkyl ether melamine resin, polyfunctional block isocyanate, and a phosphite compound. However, generally speaking, a cured coating film obtained by using such a melamine polymer as the curing agent exhibits poor acid resistance and is particularly susceptible to degradation due to acid rain which has become a problem in recent years, causing a problem in terms of the external appearance. Since the poor acid resistance of a coating film obtained by using a melamine polymer as the curing agent is attributable to the triazine ring in the melamine polymer, the problem of poor acid resistance is not solved as long as the melamine polymer is used as the curing agent.

In order to overcome this problem, Japanese Patent Application Laid-Open Gazette No. Hei 2-45577 (JP 2-45577 A) and Japanese Patent Application Laid-Open Gazette No. Hei 3-287650 (JP 3-287650 A) each describe a coating composition not using a melamine polymer. Since such a coating composition uses as the cross-linking point ester linkage produced by reacting a carboxylic acid group and an epoxy group with each other, the coating composition exhibits good acid resistance while having sufficient weatherability as the top coating film for an automobile.

Further, Japanese Patent Application Laid-Open Gazette No. Hei 9-132753 (JP 9-132753 A) describes a thermosetting coating composition using both block isocyanates (A) and (B) Block isocyanate (A) contains hydroxyl group-containing resin and block isocyanate as major components, and as the block isocyanate, having isophorone diisocyanate as an isocyanate component. Block isocyanate (B) contains an adduct of hexamethylenediisocyanate or its isocyanurate compound to a lactone modified polyhydric alcohol as an isocyanate component. However, even the coating film obtained from the thermosetting coating composition described in JP 9-132753 A still proves insufficient in terms of its flaw resistance, especially its scratch resistance.

Further, Japanese Patent Application Laid-Open Gazette No. 2003-253191 (JP 2003-253191 A) describes a clear coating composition composed of: a half-ester acid group-containing acrylic copolymer; an epoxy group-containing acrylic copolymer; and at least one carboxyl group-containing polymer selected from the group consisting of a carboxyl group-containing polyester polymer and a carboxyl group-containing acryl polymer, the clear coating composition including a predetermined amount of soft segment part represented by the following formula: —$(CH_2)_n$— (wherein n represents an integer of 4 or more). Such a clear coating composition can provide a coating film having well balanced physical properties in all the aspects of scratch, acid, and solvent resistances.

SUMMARY OF THE INVENTION

It is an object of the present invention to provide, on the basis of the above-described prior art, a clear coating composition for an automobile which allows formation of a coating film that is improved in flaw resistance (in particular, scratch resistance and scuff resistance) and acid resistance (in particular, sulfuric acid resistance), and a method of forming a multi-layer coating film using the same.

As a result of extensive studies in order to achieve the above-mentioned object, the inventors of the present invention have found that the above object can be achieved by using, in a clear coating composition containing a hydroxyl group-containing acrylic resin and a polyfunctional isocyanate compound, a hydroxyl group-containing acrylic resin obtained by using hydroxyalkyl (meth) acrylate having a hydroxyalkyl group with 4 to 9 carbon atoms as the former and an isocyanurate type isocyanate compound as the latter, setting the total amount of soft segment part and a content ratio of soft segment part derived from a lactone-containing monomer to be predetermined amounts, and setting the dynamic glass transition temperature of the obtained cured coating film to be within a predetermined range, thereby completing the present invention.

A clear coating composition for an automobile according to the present invention relates to a clear coating composition for an automobile which includes a hydroxyl group-containing acrylic resin and a polyfunctional isocyanate compound, the clear coating composition being characterized in that: the hydroxyl group-containing acrylic resin is a hydroxyl group-containing acrylic resin obtained by using hydroxyalkyl (meth)acrylate having a hydroxyalkyl group with 4 to 9 carbon atoms as at least a part of its monomer; at least a part of the polyfunctional isocyanate compound is an isocyanurate type isocyanate compound; and the clear coating composition is prepared such that the clear coating composition includes 25 to 50 mass % of a soft segment part with respect to a total solid content of the hydroxyl group-containing acrylic resin and the polyfunctional isocyanate compound, a ratio of a soft segment part derived from a lactone-containing monomer with respect to the total solid content of the hydroxyl group-containing acrylic resin and the polyfunctional isocyanate compound is not more than 4.5 mass %, and that a dynamic glass transition temperature of a cured coating film obtained from the clear coating composition is within a range of 30 to 60° C., the soft segment part being represented by the general formula (1) below:

$$—(CH_2)_n— \qquad (1)$$

(wherein n represents an integer of 4 or more).

In the clear coating composition for an automobile according to the present invention, it is preferable that the hydroxyalkyl(meth)acrylate be 4-hydroxybutyl acrylate. Further, it is preferable that the entirety of the polyfunctional isocyanate compound be composed of the isocyanurate type isocyanate compound.

Further, a multi-layer coating film forming method according to the present invention relates to a method of forming a multi-layer coating film having a top coat with respect to an object to be coated, characterized by including coating as the top coat the above-mentioned clear coating composition for an automobile.

In the multi-layer coating film forming method according to the present invention, it is preferable that after an uncured base coating film is obtained by coating a base coating composition onto the object to be coated, the clear coating composition for an automobile be coated onto the uncured base coating film to obtain an uncured clear coating film, and that the uncured base coating film and the uncured clear coating film be simultaneously heated for curing.

According to the present invention, it is possible to provide a clear coating composition for an automobile which allows formation of a coating film that is further improved in flaw resistance (in particular, scratch resistance and scuff resistance) and acid resistance (in particular, sulfuric acid resistance), and a method of forming a multi-layer coating film using the same.

DETAILED DESCRIPTION OF THE PREFERRED EMBODIMENTS

Hereinbelow, the present invention will be described in detail by way of its preferred embodiments.

First, a clear coating composition according to the present invention will be described. That is, a clear coating composition for an automobile according to the present invention relates to a clear coating composition which includes a hydroxyl group-containing acrylic resin as a coating film forming resin and a polyfunctional isocyanate compound as a curing agent, the clear coating composition being characterized in that: (i) the hydroxyl group-containing acrylic resin is a hydroxyl group-containing acrylic resin obtained by using hydroxyalkyl (meth) acrylate having a hydroxyalkyl group with 4 to 9 carbon atoms as at least a part of its monomer; (ii) at least a part of the polyfunctional isocyanate compound is an isocyanurate type isocyanate compound; and (iii) the clear coating composition is prepared such that the clear coating composition includes 25 to 50 mass % of a soft segment part with respect to a total solid content of the hydroxyl group-containing acrylic resin and the polyfunctional isocyanate compound, a ratio of a soft segment part derived from a lactone-containing monomer with respect to the total solid content of the hydroxyl group-containing acrylic resin and the polyfunctional isocyanate compound is not more than 4.5 mass %, and that a dynamic glass transition temperature of a cured coating film obtained from the clear coating composition is within a range of 30 to 60° C., the soft segment part being represented by the general formula (1) below:

$$—(CH_2)_n— \quad (1)$$

(wherein n represents an integer of 4 or more).

The curing system in the clear coating composition according to the present invention containing the hydroxyl group-containing acrylic resin and the polyfunctional isocyanate compound is as follows. That is, the isocyanate group of the polyfunctional isocyanate compound and the hydroxyl group in the hydroxyl group-containing acrylic resin are reacted with each other by heating to form a cross-linking point, and curing progresses as the hydroxyl group-containing acrylic resin undergoes cross-linking through the intermediation of the polyfunctional isocyanate compound, thereby achieving a high crosslink density. Further, in the coating film formed by performing heating and curing after forming a coating film using the clear coating composition of the present invention, the soft segment part is present in the main chain or in the cross-linking chain. The presence of the soft segment part in the main chain or in the cross-linking chain effectively imparts good flaw resistance to the coating film.

The amount of the soft segment part as represented by the above general formula (1) is a numerical value indicating the ratio of the mass of the soft segment part contained in the total solid content of the hydroxyl group-containing acrylic resin and the polyfunctional isocyanate compound, which will be described later. As for the soft segment part represented by the above general formula (1), the value of n in the general formula (1) must be 4 or more. This is because the soft segment part cannot fully exhibit its property as a soft segment when the value of n is 3 or smaller. As described above, the above-mentioned value of n represents an integer of 4 or more, preferably 4 to 9, and more preferably 4 or 5. When the above-mentioned value of n is 4 to 9, the production of a monomer or polymer having the soft segment part as represented by the above general formula (1) is easy, and the resultant soft segment part tends to excel in ease of handling. Further, two or more kinds of soft segment parts differing in the above-mentioned value of n may be also used in combination.

In the clear coating composition of the present invention, the presence of the soft segment part at the above-mentioned ratio provides the effect of achieving a further improvement in the acid resistance of the coating film while keeping the flaw resistance of the same at high level. When the ratio of the soft segment part in the total solid content of the clear coating composition is less than 25 mass %, the effect of improved flaw resistance due to the soft segment part cannot be sufficiently attained. On the other hand, in the case where the ratio of the soft segment part exceeds 50 mass %, this disadvantageously makes it impossible to attain sufficient acid resistance and solvent resistance. Further, it is preferable that the lower limit for the ratio of the soft segment part be 30 mass %; on the other hand, the upper limit for the ratio of the soft segment part is preferably 45 mass %.

Further, in the clear coating composition of the present invention, the ratio of the soft segment part derived from the lactone-containing monomer which can be used when obtaining the hydroxyl group-containing acrylic resin that will be described later must not be higher than 4.5 mass % with respect to the total solid content of the hydroxyl group-containing acrylic resin and the polyfunctional isocyanate compound. When the ratio of the soft segment part derived from the lactone-containing monomer in the total solid content of the clear coating composition exceeds 4.5 mass %, this disadvantageously makes it impossible to obtain a coating film with sufficient acid resistance.

The soft segment part may be present not only in the hydroxyl group-containing acrylic resin which will be described later but also in the polyfunctional isocyanate compound. In the clear coating composition of the present invention as described above, the ratio of the soft segment part derived from the hydroxyl group-containing acrylic resin is preferably 7 to 17 mass % with respect to the total solid content of the hydroxyl group-containing acrylic resin and the polyfunctional isocyanate compound. When the ratio of the soft segment part derived from the hydroxyl group-containing acrylic resin in the total solid content of the clear coating composition is less than 7 mass %, the coating film tends to undergo a decrease in elasticity, resulting in a decrease in flaw resistance. On the other hand, when the ratio of the soft segment part derived from the hydroxyl group-containing acrylic resin exceeds 17 mass %, the acid resistance of the obtained coating film tends to decrease.

It should be noted that the hydroxyl group-containing acrylic resin having the soft segment part can be obtained by mixing a monomer having the soft segment part as represented by the above general formula (1) at the time of the polymerization reaction thereof. Accordingly, the content of the soft segment part in the hydroxyl group-containing acrylic resin can be determined through theoretical calculation based on the mixing amount of the monomer composition used for the polymerization and the amount of soft segment part in the monomer. Further, the content of the soft segment part derived from the lactone-containing monomer in the clear coating composition of the present invention can be determined through theoretical calculation based on the mixing amount of the lactone-containing monomer used for the polymerization and the amount of the soft segment part contained therein. Further, the content of the soft segment part derived from the hydroxyl group-containing acrylic resin and the content of the soft segment part derived from the polyfunctional isocyanate compound in the clear coating composition of the present invention can be determined through theoretical calculation based on the mixing amounts thereof and the amounts of the soft segment part contained therein.

The hydroxyl group-containing acrylic resin used as the coating film forming resin in the clear coating composition of the present invention may be any acrylic resin (acrylic polymer) containing a hydroxyl group, and may further include a carboxyl group, an epoxy group, or the like. Further, the hydroxyl group-containing acrylic resin according to the present invention must be a hydroxyl group-containing acrylic resin obtained by using hydroxyalkyl(meth)acrylate having a hydroxyalkyl group with 4 to 9 carbon atoms as at least a part of its monomer. The effect of the present invention, that is, achieving a further improvement in acid resistance while keeping the flaw resistance at high level, cannot be attained unless such hydroxyalkyl(meth)acrylate having a hydroxyalkyl group with 4 to 9 carbon atoms is used.

Examples of such hydroxyalkyl (meth) acrylate having 4 to 9 carbon atoms include 4-hydroxybutyl(meth)acrylate, 5-hydroxypentyl(meth)acrylate, 6-hydroxyhexyl (meth) acrylate, 7-hydroxyheptyl (meth) acrylate, 8-hydroxyoctyl(meth) acrylate, 7-methyl-8-hydroxyoctyl(meth)acrylate, 2-methyl-8-hydroxyoctyl(meth)acrylate, and 9-hydroxynonyl(meth) acrylate. Of those, 4-hydroxybutyl(meth)acrylate and 6-hydroxyhexyl(meth)acrylate are particularly preferred because they are readily available and easy to handle.

The hydroxyl group-containing acrylic resin according to the present invention is obtained through co-polymerization of hydroxyalkyl (meth) acrylate having a hydroxyalkyl group with 4 to 9 carbon atoms and, as required, other such ethylene type unsaturated monomer (hydroxyl group-containing ethylene type unsaturated monomer and/or other such ethylene type unsaturated monomer other than the above-mentioned hydroxyalkyl(meth)acrylate).

Specific examples of a hydroxyl group-containing ethylene type unsaturated monomer other than the hydroxyalkyl (meth) acrylate having a hydroxyalkyl group with 4 to 9 carbon atoms include 2-hydroxyethyl(meth)acrylate, 2-hydroxypropyl(meth)acrylate, allyl alcohol, methacryl alcohol, and adducts of those with lactones (β-propiolactone, dimethylpropiolactone, butyl lactone, γ-valerolactone, ε-caprolactone, γ-caprolactone, γ-caprylolactone, crotolactone, δ-valerolactone, δ-caprolactone, and the like). Further, there may be used those having the above-mentioned soft segment part as at least a part of such a hydroxyl-group containing ethylene type unsaturated monomer; particularly preferred is an adduct of 2-hydroxyethyl (meth) acrylate and ε-caprolactone. It should be noted that such a hydroxyl-group containing ethylene type unsaturated monomer may be used singly or in combination of two or more kinds thereof.

A primary example of the above-mentioned other ethylene type unsaturated monomer is, although not particularly limited to, an ethylene type unsaturated monomer having a carboxyl group. Examples thereof include a (meth)acrylate derivative {for example, acrylic acid, methacrylic acid, crotonic acid, isocrotonic acid, acrylate dimer, or α-hydro-ω-((1-oxo-2-propenyl)oxy)poly(oxy(1-oxo-1,6-hexanediol)) or the like obtained by adding ε-caprolactone to acrylic acid}; and unsaturated dibasic acid, and half-ester, half-amide, and half-thioester thereof {for example, maleic acid, fumaric acid, itaconic acid, half-ester, half-amide, and half-thioester thereof, or the like}. Further, examples of ethylene type unsaturated monomers other than those having a carboxyl group include (meth) acrylate ester monomer {for example, methyl (meth)acrylate, ethyl(meth)acrylate, n-butyl(meth)acrylate, isobutyl acrylate, t-butyl acrylate, 2-ethylhexyl(meth)acrylate, lauryl methacrylate, phenyl methacrylate, isobornyl (meth)acrylate, cyclohexyl methacrylate, t-butylcyclohexyl (meth)acrylate, dicyclopentadienyl (meth) acrylate, dihydrodicyclopentadienyl (meth)acrylate, or the like}, polymerized aromatic compound (for example, styrene, α-methyl styrene, vinylketone, t-butyl styrene, parachrolostyrene, vinylnaphthalene, or the like), polymerized nitrile (for example, acrylonitrile, methacrylonitrile, or the like), α-olefin (for example, ethylene, propylene, or the like), vinyl ester (for example, vinyl acetate, vinyl propionate, or the like), diene (for example, butadiene, isoprene, or the like), and, as required, an isocyanate group-containing monomer or the like. It should be noted that such other ethylene type unsaturated monomer mentioned above may be used singly or in combination of two or more kinds thereof.

While the hydroxyl group-containing acrylic resin suitable for use in the present invention can be obtained through co-polymerization of hydroxyalkyl(meth)acrylate having a hydroxyalkyl group with 4 to 9 carbon atoms and, as required, other such ethylene type unsaturated monomer, the polymerization method is not particularly limited, and any commonly employed method described in publicly known documents, such as solution radical polymerization, may be used. For example, there may be employed a method of adding a suitable radical polymerization initiator and a monomer-mixed solution dropwise into a suitable solvent at a polymerization temperature of 60 to 160° C. over the period of 2 to 10 hours while stirring the same. The radical polymerization initiator used herein is not particularly limited as long as it is one commonly used when performing polymerization. Examples of the radical polymerization initiator include an azo-type compound (for example, dimethyl-2,2'-azobisisobutyrate), and a peroxide (for example, t-butylperoxy-2-ethylhexanoate). The amount of such an initiator is generally 0.1 to 15 mass %, preferably 0.5 to 12 mass % with respect to the total amount of unsaturated monomer. Further, the solvent that can be used herein is not particularly limited as long as it does not adversely affect the reaction. For example, ketone, a hydrocarbon type solvent (for example, propylene glycol monomethylether acetate or xylene), or the like may be used. Further, to adjust the molecular weight, mercaptan such as lauryl mercaptan, or a chain transfer agent such as α-methylstyrene dimer may be used as required.

The hydroxyl group-containing acrylic resin according to the present invention preferably has a number average molecular weight (Mn) of 1,000 to 10,000, more preferably 1,100 to 8,000. A number average molecular weight below the lower limit mentioned above tends to cause the workability of coating and the mixed-layer property with the clear coating film to decrease, whereas a number average molecular weight exceeding the above-mentioned upper limit tends to cause a deterioration in workability due to a decrease in the solid contents at the time of coating. Further, the number average molecular weight of the hydroxyl group-containing acrylic resin is preferably within the range of 1,200 to 7,000 from the viewpoint of the external appearance of the coating film. Further, the hydroxyl value of the hydroxyl group-containing acrylic resin according to the present invention is preferably 50 to 280 mgKOH/g, and more preferably 70 to 260 mgKOH/g. A hydroxyl value exceeding the above-mentioned upper limit tends to cause a decrease in the water resistance of the obtained coating film, whereas a hydroxyl value below the above-mentioned lower limit tends to cause a decrease in the curability of the coating film.

The mixing ratio of the hydroxyalkyl (meth) acrylate having a hydroxyalkyl group with 4 to 9 carbon atoms at the time of obtaining the hydroxyl group-containing acrylic resin according to the present invention is preferably 30 to 60 mass %, with the total amount of monomer used for producing the hydroxyl group-containing acrylic resin being taken as the reference. A mixing ratio of the hydroxyalkyl(meth)acrylate below the above-mentioned lower limit tends to cause a decrease in the flaw resistance of the obtained coating film, whereas a mixing ratio exceeding the above-mentioned upper limit tends to cause a decrease in the acid resistance and water resistance of the obtained coating film.

Further, the mixing ratio of the hydroxyl group-containing ethylene type unsaturated monomer (the total amount of the above-mentioned hydroxyalkyl(meth)acrylate and the hydroxyl group-containing ethylene type unsaturated monomer other than the same) is preferably 5 to 60 mass %, and the mixing ratio of the other ethylene type unsaturated monomer is preferably 95 to 40 mass %. A mixing ratio of the hydroxyl group-containing ethylene type unsaturated monomer below the above-mentioned lower limit tends to cause a decrease in production stability, whereas a mixing ratio exceeding the above-mentioned upper limit tends to cause a decrease in the water resistance of the obtained coating film.

Further, the content of all the soft segment parts in the hydroxyl group-containing acrylic resin according to the present invention is preferably 7 to 30 mass % with respect to the total solid content thereof. When the content of all the soft segment parts is below the above-mentioned lower limit, this tends to make it difficult to obtain a coating film having its flaw resistance sufficiently improved, whereas when the content exceeds the above-mentioned upper limit, this tends to make it difficult to obtain a coating film having sufficient acid resistance. Further, in the hydroxyl group-containing acrylic resin according to the present invention, the content of the lactone part (in the case where a lactone-containing monomer is used, the lactone part thereof) is preferably not higher than 25 mass % with respect to the total solid content of the hydroxyl group-containing acrylic resin, and the content of the soft segment part derived from the lactone-containing monomer is preferably not higher than 15 mass % with respect to the total solid content of the hydroxyl group-containing acrylic resin. When the content of the soft segment part derived from the lactone-containing monomer exceeds the above-mentioned upper limit, this tends to make it difficult to obtain a coating film having sufficient acid resistance. It should be noted that such a hydroxyl group-containing acrylic resin may be used singly or in combination of two or more kinds thereof.

The polyfunctional isocyanate compound to be used as the curing agent for the clear coating composition of the present invention must be at least partially composed of an isocyanurate type isocyanate compound (so-called isocyanate), and it is particularly preferable that the polyfunctional isocyanate compound be entirely composed of the isocyanurate type isocyanate compound. The effect of the present invention, that is, achieving a further improvement in acid resistance while keeping the flaw resistance at high level, cannot be attained unless such an isocyanurate type isocyanate compound is used.

Examples of such an isocyanurate type isocyanate compound include a trimer of diisocyanate generally including 5 to 24, preferably 6 to 18, carbon atoms. Such an isocyanate compound may be a so-called asymmetric type. Examples of diisocyanate constituting such an isocyanurate type isocyanate compound include trimethylene diisocyanate, tetramethylene diisocyanate, hexamethylene diisocyanate (HDI), 2,2,4-trimethylhexane diisocyanate, undecane diisocyanate-(1, 11), lysine ester diisocyanate, cyclohexane-1,3- and 1,4-diisocyanate, 1-isocyanato-3-isocyanatomethyl-3,5,5-trimethylcyclohexane(isophorone diisocyanate: IPDI), 4,4'-diisocyanatodicyclomethane, ω, ω'-dipropylether diisocyanate, thiodipropyl diisocyanate, cyclohexyl-1,4-diisocyanate, dicyclohexylmethane-4,4'-diisocyanate, 1,5-dimethyl-2,4-bis(isocyanatomethyl)benzene, 1,5-trimethyl-2,4-bis(ω-isocyanatoethyl)-benzene, 1,3,5-trimethyl-2,4-bis(isocyanatomethyl)benzene, 1,3,5-triethyl-2,4-bis(isocyanatomethyl)benzene, and dicyclohexyldimethylmethane-4,4'-diisocyanate. Further, there may also be used aromatic diisocyanate such as 2,4-diisocyanatotoluene and/or 2,6-diisocyanatotoluene, 4,4'-diisocyanatodiphenylmethane, or 1,4-diisocyanatoisopropylbenzene.

The isocyanurate type isocyanate compound according to the present invention may be used singly or in combination of two or more kinds thereof. Further, in the present invention, the isocyanurate type isocyanate compound may be used as a mixture by being combined with an aliphatic, alicyclic, or aromatic group-containing aliphatic or aromatic polyfunctional isocyanate compound (preferably the above-mentioned diisocyanate or a dimer thereof). In this case, the content ratio of the isocyanurate type isocyanate compound in the total amount of the polyfunctional isocyanate compound is preferably not lower than 60 mass %. A content ratio of the isocyanurate type isocyanate compound below the above-mentioned lower limit tends to make it difficult to obtain a coating film with sufficient acid resistance.

It should be noted that the soft segment part may be present in the above-mentioned polyfunctional isocyanate compound, and that the content ratio of the soft segment part in the polyfunctional isocyanate compound according to the present invention is preferably not higher than 60 mass % with respect to the total solid content thereof.

It is preferable that the clear coating composition for an automobile according to the present invention include a hydroxyl group-containing acrylic resin as the coating film forming resin, and a polyfunctional isocyanate compound as the curing agent, and that the mixing ratios of the hydroxyl group-containing acrylic resin and polyfunctional isocyanate compound be such that the number of isocyanate groups in the polyfunctional isocyanate compound is within the range of 0.5 to 1.5 with the number of hydroxyl groups in the hydroxyl group-containing acrylic resin taken as 1. A content ratio of the polyfunctional isocyanate compound below the above-mentioned lower limit tends to result in insufficient curing, whereas a content ratio exceeding the above-mentioned upper limit tends to result in a deterioration in flaw resistance as an unreacted isocyanate group reacts with moisture in the air to cause an increase in Tm of the obtained coating film.

The above described clear coating composition may be one having an organic tin compound curing catalyst. The organic tin compound curing catalyst is not particularly limited, and examples thereof include dibutyltin dilaurate, dibutyltin diacetate, and dibutyltin dioctate. The mixing amount of the curing catalyst is preferably 0.005 mass part at the lowest and 0.05 mass part at the highest with respect to 100 mass parts of the total solid polymer content in the clear coating composition.

In addition to the hydroxyl group-containing acrylic resin and the polyfunctional isocyanate compound, an ultraviolet absorber, a hindered amine light stabilizer, an anti-oxidant, cross-linking resin particles, a surface regulator, or the like may be mixed into the clear coating composition. In the case where the cross-linking resin particles are used, they are preferably mixed at a ratio within the range of 0.01 mass % at the lowest to 10 mass % at the highest with respect to the solid resin content in the clear coating composition of the present invention. The above-mentioned lower limit is more preferably 0.1 mass %, and the above-mentioned upper limit is more preferably 5 mass %. When the adding amount of the cross-linking resin particles exceeds 10 mass %, the external appearance of the obtained coating film tends to deteriorate, whereas when the adding amount is below 0.01 mass %, a sufficient rheology control effect tends not to be obtained.

The clear coating composition of the present invention as described above must be prepared such that the dynamic glass transition temperature (Tg) of the cured coating film obtained falls within the range of 30 to 60° C. (particularly preferably 40 to 60° C.). When the dynamic glass transition temperature of the obtained coating film is below the above-mentioned lower limit, the coating film is liable to soften, so a sufficient improvement in acid resistance cannot be attained. On the other hand, when the dynamic glass transition temperature of the obtained coating film exceeds the above-mentioned upper limit, a sufficient improvement in scratch resistance cannot be attained.

Further, the clear coating composition of the present invention is preferably prepared such that the crosslink density of the cured coating film obtained is not lower than $0.8 \times 10^{-3}$ mol/cc (particularly preferably within the range of $1.0 \times 10^{-3}$ to $2.5 \times 10^{-3}$ mol/cc). When the crosslink density of the cured coating film obtained is below the above-mentioned lower limit, the stain resistance with respect to water stain or the like tends not to sufficiently improve, and the flaw resistance retention property also tends to decrease. It should be noted that the crosslink density is determined by the following method according to the present invention. That is, using a forced stretching vibration type viscoelasticity measurement apparatus (Vibron from Orientec Corporation), the dynamic elastic modulus (E') at the time of a temperature rise is determined, and the crosslink density is calculated by the expression below based on the temperature at which the value of E' becomes minimum and the minimum value at this time. It should be noted that the measurement frequency is set to 11 Hz. $E'=3 nRT$ (n: crosslink density, R: gas constant, T: absolute temperature).

The clear coating composition of the present invention can be coated by spray coating, brush coating, dip coating, roll coating, flow coating, or the like. Further, the clear coating composition of the present invention can be advantageously used for any kind of substrate, for example, wood, metal, glass, cloth, plastic, foam, or the like, particularly for plastic and metal surfaces (for example, steel, aluminum and an alloy thereof), and can be suitably used as the clear coating for an automobile.

Next, a multi-layer coating film forming method according to the present invention will be described. That is, a multi-layer coating film forming method according to the present invention relates to a method of forming a multi-layer coating film having a top coat with respect to an object to be coated, the method being characterized in that the above-described clear coating composition for an automobile according to the present invention is coated as the top coat.

While various mediums, for example, a metal molding, a plastic molding, a foam, and the like may be used as the object to be coated, a metal molding of iron, aluminum, and an alloy thereof, a plastic molding, or the like may be used as the object to be coated on which a multi-layer coating film for an automobile is formed. The method is preferably applied to a metal molding allowing cationic electrodeposition coating. The surface of the object to be coated is preferably subjected to chemical conversion. Further, the object to be coated may have an electrodeposition coating film formed thereon. While the above-mentioned electrodeposition coating may be cationic or anionic one, from the viewpoint of corrosion prevention, it is preferably cationic electrodeposition coating.

Further, an intermediate coating film may be further formed as required. Intermediate coating is used for forming the intermediate coating film. The intermediate coating is not particularly limited, and there may be used aqueous or organic solvent-based ones well known to those skilled in the art or the like.

In the multi-layer coating film forming method according to the present invention, it is preferable that after an uncured base coating film is obtained by coating a base coating composition onto the object to be coated, the clear coating composition for an automobile of the present invention be coated onto the uncured base coating film to obtain an uncured clear coating film, and the uncured base coating film and the uncured clear coating film be simultaneously heated for curing. Further, it is also possible to coat the clear coating composition for an automobile according to the present invention as a second clear coating on each of the uncured base and cured clear coating films, followed by heating the same for curing.

The above-mentioned base coating is not particularly limited. The base coating may include, for example, a coating film forming resin, a curing agent, an organic, inorganic or luster color pigment and extender pigment, or the like. The form of the base coating is not particularly limited, and aqueous or organic solvent-based one or the like may be used.

The method of coating the base coating onto the object to be coated is not particularly limited, and spray coating, rotary spray coating, or the like may be employed. From the viewpoint of external appearance, multi-stage coating using those methods, or a coating method combining those methods is preferably employed.

It is preferable that in the multi-layer coating film forming method according to the present invention, the thickness of the coating film due to the base coating be within the range of 10 μm at the lowest to 20 μm at the highest at dry film thickness. Further, in the multi-layer coating film forming method according to the present invention, when the base coating used is an aqueous one, it is desirable, in order to obtain a coating film with a favorable finish, to heat the uncured base coating film at a temperature of 40 to 100° C. for 2 to 10 minutes prior to the coating of the clear coating composition.

In the multi-layer coating film forming method according to the present invention, specific examples of the method of coating the clear coating composition of the present invention include those using a rotary spray coating type electrostatic spray coater called Micro Bell or Micro-Micro Bell.

In the multi-layer coating film forming method according to the present invention, the thickness of the coating film due to the clear coating is preferably within the range of 30 μm at the lowest to 45 μm at the highest at dry film thickness. Further, the uncured base coating film and the uncured clear coating film, which are formed by the above-described method, are preferably heated for curing at the same time, thereby forming the multi-layer coating film. The above-mentioned heating is preferably performed at a temperature that is within the range of 100° C. at the lowest to 180° C. at the highest. Further, more preferably, the lower limit and the upper limit of the temperature are 120° C. and 160° C., respectively. Although varying according to the curing temperature or the like, the heat curing time is suitably 10 to 30 minutes in the case where heat curing is performed at the above-mentioned heat curing temperature.

The film thickness of the multi-layer coating film thus obtained is preferably within the range of 40 μm at the lowest to 65 μm at the highest. A multi-layer coating film obtained by the above-described multi-layer coating film forming method of the present invention is excellent in flaw resistance (in particular, scratch resistance and scuff resistance) and acid resistance (in particular, sulfuric acid resistance).

EXAMPLES

While hereinbelow the present invention will be described more specifically on the basis of examples and comparative examples, the present invention is not limited to the examples described below. It should be noted that when so simply stated herein, "%" shall mean "mass %".

Synthetic Example 1

Synthesis of Hydroxyl Group-Containing Acrylic Resin "a"

358.0 g of propylene glycol monomethylether acetate and 90.0 g of xylene were put into a glass container (2 liter) equipped with a stirring blade, a nitrogen introducing tube, a cooling condenser, and a dropping funnel, followed by heating under nitrogen atmosphere at 130° C. Using the dropping funnel, 100.0 g of propylene glycol monomethylether acetate, 100.0 g of tert-butyl peroxy-2-ethylhexanoate, 200.0 g of styrene, 288.5 g of n-butyl acrylate, 74.5 g of 2-ethylhexyl methacrylate, and 437.0 g of 4-hydroxybutyl acrylate were added dropwise at a constant rate over the period of three hours. Thereafter, the resultant was retained at 130° C. for 0.5 hour. 10.0 g of tert-butyl peroxy-2-ethylhexanoate was dissolved in 50.0 g of propylene glycol monomethylether acetate and the obtained solution was added dropwise at a constant rate over the period of 30 minutes to the above-described retained solution. Further, by continuing the heating at 130° C. for 1.0 hour, the target hydroxyl group-containing acrylic resin "a" was obtained.

With respect to the hydroxyl group-containing acrylic resin "a" thus synthesized, the values of molecular weight as calculated as standard polystyrene using GPC were: Mn=4700; and Mw=13500. Further, the hydroxyl value was 170 mgKOH/g, the calculation Tg was −25° C., the solid resin content was 63.5%, and the lactone part content ratio was 0%. Further, the content ratio of the soft segment part in the hydroxyl group-containing acrylic resin "a" was 16.99% with respect to the total solid content, and the content ratio of the soft segment part derived from a lactone-containing monomer was 0%. The composition and physical properties of the above-described hydroxyl group-containing acrylic resin "a" were shown in Table 1.

Synthetic Examples 2 through 8

Synthesis of Hydroxyl Group-Containing Acrylic Resins B Through H

Hydroxyl group-containing acrylic resins b through h were synthesized using the monomer components, solvents, and polymerization initiators shown in Table 1 in the same manner as in Synthetic Example 1 except that the mixing amounts thereof are set to those shown in Table 1. It should be noted that a 1:1 adduct (from DAICEL CHEMICAL INDUSTRIES, LTD.) of 2-hydroxyethyl methacrylate and ε-capro lactone, a 1:2 adduct (from DAICEL CHEMICAL INDUSTRIES, LTD.) of 2-hydroxyethyl methacrylate and α-capro lactone, and a 1:5 adduct (from DAICEL CHEMICAL INDUSTRIES, LTD.) of 2-hydroxyethyl methacrylate and ε-capro lactone were used as the Placcel FM-1, Placcel FM-2, and Placcel FM-5, respectively.

The molecular weight (Mn), the molecular weight (Mw), the hydroxyl value, the calculation Tg, the solid resin content, the lactone part content ratio, the content ratio of all the soft segment parts in the solid resin content, the content ratio of soft segment part derived from a lactone-containing monomer, and the content ratio of lactone-free monomer-derived soft segment part of the synthesized hydroxyl group-containing acrylic resins b through h were those as shown in Table 1.

TABLE 1

| Hydroxyl group-containing acrylic resin [* 1] | a | b | c | d | e | f | g | h |
|---|---|---|---|---|---|---|---|---|
| Propylene glycol monomethylether acetate (solvent) (g) | 508.0 | 508.0 | 508.0 | 508.0 | 598.0 | 508.0 | 508.0 | 508.0 |
| Xylene (solvent) (g) | 90.0 | 90.0 | 90.0 | 90.0 | | 90.0 | 90.0 | 90.0 |
| Tert-butyl peroxy-2-ethylhexanoate (polymerization initiator) (g) | 110 | 110 | 110 | 110 | 110 | 110 | 110 | 110 |
| Styrene (lactone-free monomer) (g) | 200.0 | 200.0 | 70.0 | 70.0 | 20.0 | 70.0 | 68.9 | 200.0 |
| n-butyl acrylate (lactone-free monomer) (g) | 288.5 | 204.3 | 43 | 120 | | 140.0 | 312.0 | 122.0 |
| n-butyl methacrylate (lactone-free monomer) (g) | | | 392 | 285 | | 160 | | 191 |
| 2-ethylhexyl acrylate (lactone-free monomer) (g) | | | | | 95.0 | 80 | | 50.0 |
| 2-ethylhexyl methacrylate (lactone-free monomer) (g) | 74.5 | 74.5 | 80.0 | 80.0 | | | 182.1 | |

TABLE 1-continued

| Hydroxyl group-containing acrylic resin [* 1] | | a | b | c | d | e | f | g | h |
|---|---|---|---|---|---|---|---|---|---|
| 2-hydroxyethyl acrylate (lactone-free monomer) (g) | | | | | | 100.0 | | | |
| 4-hydroxybutyl acrylate (lactone-free monomer) (g) | | 437.0 | | 365.0 | 345.0 | 435.0 | 275.0 | 437.0 | 437.0 |
| 6-hydroxyhexyl acrylate (lactone-free monomer) (g) | | | 521.2 | | | | | | |
| Placcel FM-1 (lactone-containing monomer) (g) | | | | | | | 275.0 | | |
| Placcel FM-2 (lactone-containing monomer) (g) | | | | 50 | 100 | 70.0 | | | |
| Placcel FM-5 (lactone-containing monomer) (g) | | | | | | 280.0 | | | |
| Monomer total (g) | | 1000.0 | 1000.0 | 1000.0 | 1000.0 | 1000.0 | 1000.0 | 1000.0 | 1000.0 |
| Calculation Tg(° C.) | | −25 | — | −11 | −18 | −40 | −23 | −35 | −12 |
| Hydroxyl value (mgKOH/g) | | 170 | 170 | 150 | 150 | 251 | 170 | 170 | 170 |
| Molecular weight (Mn) | | 4700 | 4500 | 3900 | 4100 | 4700 | 4000 | 3900 | 4500 |
| Molecular weight (Mw) | | 13500 | 12800 | 9100 | 9200 | 11300 | 9400 | 9700 | 11000 |
| Solid resin content (Mass %) | | 63.5 | 62.5 | 62.2 | 62.1 | 63.3 | 64.5 | 62.8 | 62.1 |
| Lactone part content ratio (Mass %) | | 0 | 0 | 3.2 | 6.4 | 27.3 | 12.85 | 0 | 0 |
| Content ratio of soft segment part in solid resin content (Mass %) | Content ratio of soft segment part derived from lactone-containing monomer (mass %) | 0 | 0 | 1.95 | 3.91 | 16.74 | 7.89 | 0 | 0 |
| | Content ratio of soft segment part derived from lactone-free monomer (mass %) | 16.99 | 25.44 | 14.20 | 13.42 | 16.91 | 10.69 | 16.99 | 16.99 |
| | Content ratio of all soft segment parts (mass %) | 16.99 | 25.44 | 16.15 | 17.33 | 33.65 | 18.58 | 16.99 | 16.99 |

[* 1]: Blank columns represent 0.

Examples 1 through 4 and Comparative Examples 1 through 5

Clear coating compositions of Examples 1 through 4 and Comparative Examples 1 through 5 were obtained by mixing respective components in accordance with the formulations as shown in Table 2, followed by stirring with a disper. The above clear coating compositions were each subjected to dilution to 25 seconds/20° C. with thinner composed of propylene glycol monomethylether acetate/3-ethyl ethoxypropionate=1/2 (mass ratio) using a No. 4 ford cup. It should be noted that the biuret type isocyanate curing agent used was SUMI-JOUR brand curing agent from Sumika-Bayer Urethane Co., Ltd, and the isocyanurate type isocyanate curing agent used was SUMI-JOUR N3300 brand curing agent from Sumika-Bayer Urethane Co., Ltd.

Next, a cationic electrode position coating (Power Top U-50 brand cationic electrode position coating from Nippon Paint Co., Ltd.) was subjected to electrodeposition onto a dull steel plate of 150×300×0.8 mm, which had under gone treatment with zinc phosphate, to have a dry film thickness of 20 μm, followed by baking for 30 minutes at 160° C. to obtain a coated plate. Then, a melamine-curing polyester resin-based gray intermediate coating (ORGA P-2 brand coating from Nippon Paint Co., Ltd.), which had been pre-diluted with a NO. 4 ford cup to 25 seconds/20° C., was subjected to two-stage coating onto the coated plate with an air spray into a dry film thickness of 35 μm, followed by baking for 30 minutes at 140° C. and then cooled down thereby to obtain an intermediate coating substrate. An aqueous base coating (Super Rack M-260 Black brand coating from Nippon Paint Co., Ltd.) was spray-coated onto the intermediate coating substrate under the conditions of 25° C. room temperature and 85% humidity into a dry film thickness of 15 μm, followed by pre-heating for 3 minutes at 80° C. After the pre-heating, the coated plate was allowed to stand to cool to room temperature, and an acrylic melamine curing type clear coating (Super Rack O-170 brandcoating from Nippon Paint Co., Ltd.) was coated thereon into a dry film thickness of 30 μm as a first clear coating, followed by heat-curing at 140° C. for 25 minutes. The above-mentioned first clear substrate was polished with #2000 wet sand paper, and then each of the diluted clear coating compositions was spray-coated into a dry film thickness of 35 μm, followed by heating in a drying furnace at 140° C. for 25 minutes, thereby forming a multi-layer coating film on the substrate.

The content ratios of the various kinds of soft segment part (the content ratio of the soft segment part derived from a lactone-containing monomer, the content ratio of soft segment part derived from a lactone-free monomer, the content ratio of all the soft segment parts derived from a hydroxyl group-containing acrylic resin, the content ratio of soft segment part derived from an isocyanate curing agent, and the content ratio of all the soft segment parts (mass %)) in the total solid content of each of the clear coating compositions obtained by Examples 1 through 4 and Comparative Examples 1 through 5 are those as shown in Table 2.

Further, the dynamic glass transition temperatures and crosslink densities of the cured coating films obtained by using the clear coating compositions obtained by Examples 1 through 4 and Comparative Examples 1 through 5 are those as shown in Table 2.

<Acid Resistance Test>

An evaluation on acid resistance using a 40% sulfuric acid aqueous solution was carried out according to the following evaluation method with respect to each of the multi-layer coating films obtained by using the clear coating compositions of Examples 1 through 4 and Comparative Examples 1 through 5.

That is, first, the 40% sulfuric acid aqueous solution was prepared from ion-exchanged water and sulfuric acid of a reagent grade. Next, the above sulfuric acid solution was added dropwise by 0.6 ml at a time onto each of the multi-layer coating films obtained by using the clear coating compositions of Examples 1 through 4 and Comparative Examples 1 through 5, held at 80° C. in a heating oven for 30 minutes, and then washed with water. Thereafter, spot marks on the multi-layer coating film were visually observed for evaluation on the basis of the following criteria. The results obtained are shown in Table 2.

A: No abnormality in the spot portion.
AB: Both the cases of A and B were observed.
B: Swelling and contraction were observed in the spot portion, but no peeling of the coating was observed.
C: The coating of the spot portion was peeled off.

<Scuff Resistance Test>

An evaluation on scuff resistance was carried out according to the following evaluation method with respect to each of the multi-layer coating films obtained by using the clear coating compositions of Examples 1 through 4 and Comparative Examples 1 through 5.

First, a test dust composition composed of 15 g of a test dust (mixture of 7 kinds, particle size: 27 to 31 μm) and 100 g of water was spread on the base of a miniature carwash, and then the miniature carwash was rotated (45 rpm) to undergo one reciprocation without flowing water, thereby allowing the dust to adhere onto the car wash brush. Thereafter, a coating plate (70 mm×150 mm) was fixed on the base, and after sprinkling about 5 g of molding sand, the miniature carwash was rotated (96 rpm) to undergo three reciprocations without flowing water. After the test, water washing and drying were performed. The 200 gloss of the coating plate was measured, and a gloss retention (initial 200 GR (%)), which is a ratio of the 20° gloss at this time to the 20°gloss before the test, was calculated. The results obtained were shown in Table 2.

<Scratch Resistance Test>

An evaluation on scratch resistance was carried out according to the following evaluation method with respect to each of the multi-layer coating films obtained by using the clear coating compositions of Examples 1 through 4 and Comparative Examples 1 through 5.

That is, using a continuous loading type scratch hardness testing machine (TRIBOGEAR TYPE: 18, manufactured by Shinto Sceientific Co., Ltd.), each multi-layer coating film was subjected to continuous loading at a load of 0 g to 200 g at a test temperature of 25° C. The degree of flaw in each coating film after the test was visually observed for evaluation on the basis of the following criteria. The results obtained were shown in Table 2.

A: Almost no scratch was observed.
B: Slight scratch was observed.
C: The scratch was conspicuous.
D: The scratch was very conspicuous.

TABLE 2

| | Content ratio of lactone part (mass %) | Content ratio of soft segment part derived from lactone-containing monomer (mass %) | Content ratio of soft segment part derived from lactone-free monomer (mass %) | Content ratio of all soft segment parts (mass %) | Examples (solid content mixing amount) (mass %) [*1] | | | | Comparative Examples (solid content mixing amount) (mass %) [*1] | | | | |
|---|---|---|---|---|---|---|---|---|---|---|---|---|---|
| | | | | | 1 | 2 | 3 | 4 | 1 | 2 | 3 | 4 | 5 |
| Hydroxyl group-containing acrylic resin a | 0 | 0 | 17.0 | 17.0 | 64.4 | | | | | | | | |
| Hydroxyl group-containing acrylic resin b | 0 | 0 | 25.4 | 25.4 | | 64.4 | | | | | | | |
| Hydroxyl group-containing acrylic resin c | 3.18 | 1.95 | 14.2 | 16.2 | | | 66 | | | | | | |
| Hydroxyl group-containing acrylic resin d | 6.37 | 3.91 | 13.4 | 17.3 | | | | 66 | | | | | |
| Hydroxyl group-containing acrylic resin e | 27.3 | 16.74 | 16.9 | 33.7 | | | | | 53.8 | | | | |
| Hydroxyl group-containing acrylic resin f | 12.85 | 7.89 | 10.7 | 18.6 | | | | | | 63.2 | 63.2 | | |
| Hydroxyl group-containing acrylic resin g | 0 | 0 | 17.0 | 17.0 | | | | | | | | 63.2 | |
| Hydroxyl group-containing acrylic resin h | 0 | 0 | 17.0 | 17.0 | | | | | | | | | 63.2 |
| Biuret type isocyanate curing agent | 0 | 0 | 0.0 | 52.7 | 35.6 | 35.6 | 34 | 34 | 46.2 | 36.8 | 36.8 | 36.8 | 36.8 |
| Isocyanurate type isocyanate curing agent | 0 | 0 | 0.0 | 50.0 | | | 2.1 | 4.2 | 14.69 | 8.1 | 8.1 | | |
| Content ratio of lactone part in total solid content of clear coating composition (mass %) | | | | | 0.0 | 0.0 | 1.3 | 2.6 | 9.0 | 5.0 | 5.0 | 0.0 | 0.0 |
| Content ratio of soft segment part in total solid content of clear coating composition (mass %) | | | | | | | | | | | | | |
| Content ratio of soft segment part derived from lactone-containing monomer (mass %) | | | | | | | 9.4 | 8.9 | 9.1 | 6.8 | 6.8 | 10.7 | 10.7 |
| Content ratio of soft segment part derived from lactone-free monomer (mass %) | | | | | 10.9 | 16.4 | 10.7 | 11.4 | 18.1 | 11.7 | 11.7 | 10.7 | 10.7 |
| Content ratio of all soft segment parts derived from hydroxyl group-containing acrylic resin (mass %) | | | | | 17.8 | 17.8 | 16.9 | 17.0 | 24.3 | 19.4 | 18.4 | 19.4 | 19.4 |
| Content ratio of soft segment part derived from isocyanate curing agent (mass %) | | | | | 28.7 | 34.2 | 27.6 | 28.4 | 42.5 | 31.2 | 30.1 | 30.1 | 30.1 |
| Total | | | | | 45.9 | 46.7 | 47.9 | 45.2 | 52.1 | 50.3 | 46.1 | 47.9 | 64.7 |
| Physical property values of coating film — Dynamic Tg (°C.) / Crosslink density (×10⁻³ mol/cc) | | | | | 1.951 | 1.895 | 1.805 | 1.698 | 2.250 | 1.986 | 1.830 | 2.185 | 1.934 |
| Acid resistance | | | | | AB | AB | AB | A | C | C | B | B | B |
| Car washing scuff resistance | | | | | 95 | 96 | 96 | 96 | 98 | 95 | 96 | 96 | 96 |
| Scratch resistance | | | | | B | B | B | A | B | B | B | B | D |

[*1]: Blank columns represent 0.

As is apparent from the results shown in Table 2, while the multi-layer coating film obtained by using the clear coating composition of the present invention proved excellent in flaw resistance (scratch resistance and scuff resistance) and acid resistance (sulfuric acid resistance), the multi-layer coating film obtained by using the clear coating composition of each of Comparative Examples proved inferior particularly in acid resistance and scratch resistance.

As described in the foregoing, according to the present invention, it is possible to obtain a clear coating composition for an automobile which allows formation of a coating film further improved in flaw resistance (particularly scratch resistance and scuff resistance) and acid resistance (particularly sulfuric acid resistance). Therefore, according to the multi-layer coating film forming method of the present invention which uses the clear coating composition of the present invention, it is possible to efficiently and reliably form a coating film for an automobile which is excellent both in terms of flaw resistance and acid resistance.

What is claimed is:

1. A clear coating composition for an automobile, comprising a hydroxyl group-containing acrylic resin and a polyfunctional isocyanate compound, wherein:
   the hydroxyl group-containing acrylic resin is a hydroxyl group-containing acrylic resin obtained by using hydroxyalkyl (meth) acrylate having a hydroxyalkyl group with 4 to 9 carbon atoms as a monomer;
   at least 60 mass % of the total amount of the polyfunctional isocyanate compound is an isocyanate compound having an isocyanurate structure; and
   the clear coating composition is prepared such that the clear coating composition includes 25 to 50 mass % of a soft segment part with respect to a total solid content of the hydroxyl group-containing acrylic resin and the polyfunctional isocyanate compound, a ratio of a soft segment part derived from a lactone-containing monomer with respect to the total solid content of the hydroxyl group-containing acrylic resin and the polyfunctional isocyanate compound is not more than 4.5 mass %, a content ratio of the soft segment part in the hydroxyl-group containing acrylic resin is 7 to 30 mass % with respect to the solid content of the hydroxyl group-containing acrylic resin, a content ratio of the soft segment part in the polyfunctional isocyanate compound is not greater than 60 mass % with respect to the solid content of the polyfunctional isocyanate compound, and that a dynamic glass transition temperature of a cured coating film obtained from the clear coating composition is within a range of 30 to 60° C., the soft segment part being represented by the formula (1) below:

$$-(CH_2)_n- \quad (1)$$

wherein n represents an integer of 4 or more, and the soft segment part being present in a main chain or in a cross-linking chain in the clear coating composition.

2. The clear coating composition for an automobile according to claim 1, wherein the hydroxyalkyl (meth) acrylate is 4-hydroxybutyl acrylate.

3. The clear coating composition for an automobile according to claim 1, wherein the entirety of the polyfunctional isocyanate compound is an isocyanate compound having an isocyanurate structure.

4. A method of forming a multi-layer coating film having a top coat with respect to an object to be coated, the method comprising coating as the top coat the clear coating composition for an automobile as claimed in claim 1.

5. The method of forming a multi-layer coating film according to claim 4, wherein the method further comprises, after an uncured base coating film is obtained by coating a base coating composition onto the object to be coated, coating the clear coating composition onto the uncured base coating film to obtain an uncured clear coating film, and curing by simultaneously heating the uncured base coating film and the uncured clear coating film.

6. The clear coating composition for an automobile according to claim 1, wherein the clear coating composition is prepared such that the clear coating composition includes 30 to 50 mass % of the soft segment part with respect to the total solid content of said hydroxyl group-containing acrylic resin and the polyfunctional isocyanate compound.

7. The clear coating composition for an automobile according to claim 1, wherein the clear coating composition is prepared such that the clear coating composition includes up to 45 mass % of the soft segment part with respect to the total solid content of said hydroxyl group-containing acrylic resin and the polyfunctional isocyanate compound.

8. The clear coating composition for an automobile according to claim 1, wherein the clear coating composition is prepared such that the clear coating composition includes 30 to 45 mass % of the soft segment part with respect to the total solid content of said hydroxyl group-containing acrylic resin and the polyfunctional isocyanate compound.

* * * * *